United States Patent Office 3,240,739
Patented Mar. 15, 1966

3,240,739
MAKING SPINNING SOLUTIONS OF VINYL CYANIDE/N-VINYL-3-MORPHOLINONE COPOLYMERS IN AQUEOUS ZINC CHLORIDE MEDIA
Stanley A. Murdock, Concord, Calif., Ardy Armen, Newport News, Va., and Giles R. Cokelet, Arlington, Mass., assignors to The Dow Chemical Company, Midland, Mich., a corporation of Delaware
No Drawing. Filed Apr. 13, 1960, Ser. No. 21,906
7 Claims. (Cl. 260—29.6)

The present invention contributes particularly to the man-made synthetic textile fiber art and, more particularly, relates to the making of fiber-forming copolymers of vinyl cyanide (i.e., acrylonitrile) and N-vinyl-3-morpholinone monomers directly as spinnable compositions in aqueous zinc chloride media.

The inherent properties of polyvinylcyanide (i.e., polyacrylonitrile) have made it especially suited for fibers. The main exception to this lies in the generally poor dyeability of polyacrylonitrile fibers.

One technique for enhancing the dyeability of vinyl cyanide polymer products, especially those intended for use in the manufacture of synthetic textile and the like fibers, is to prepare random copolymers of the vinyl cyanide with other monomers that secure for the copolymer product adequate receptivity for or colorability with many of a wide variety of dyestuffs.

A great number of various comonomers have been suggested and employed for such purpose in the preparation of dye-receptive vinyl cyanide polymer products. Included amongst these are various vinylated N-heterocyclic monomers, such as the N-vinyl lactams, particularly, N-vinyl-2-pyrrolidone.

While vinyl cyanide copolymer products prepared from many of the N-vinyl heterocyclics, such as N-vinyl-2-pyrrolidone, may be satisfactory insofar as dyeability and physical properties are concerned, serious difficulties are encountered when it is attempted to use such copolymers in certain solvent media therefor. This is particularly the case when it is attempted to directly prepare the copolymer by polymerization in order to directly provide a spinning solution thereby in such advantageous media as the aqueous, zinc chloride-containing saline solvents for vinyl cyanide and polyacrylonitrile. Of course, it is of great advantage and benefit to be able to directly provide spinning solutions and the like by polymerization of the fiber-forming polymer products to be spun in the same solvent media used in the spinning solution itself.

The chief aim and design of the present invention is to provide a method for the direct preparation in aqueous zinc chloride-containing saline solvents of spinning solutions and the like of dye-receptive vinyl cyanide copolymers containing, polymerized in the copolymer molecule, dye-attracting N-vinyl heterocyclic constituents by direct polymerization of the desired comonomers in the saline solvent media therefor.

Additional objectives and many cognate advantages will be apparent throughout the description and specification which follows.

To realization of the above-stated ends, spinning solutions in aqueous zinc chloride-containing saline solvent media of dye-receptive, fiber-forming vinyl cyanide copolymers containing an N-vinyl heterocyclic constituent copolymerized therein are prepared by dissolving a polymer-forming mixture of vinyl cyanide and an N-vinyl-3-morpholinone monomer (of the type hereinafter more fully delineated) in an aqueous, zinc chloride-containing saline solvent for vinyl cyanide and polyacrylonitrile and polymerizing the monomers directly in such media to directly provide a spinnable composition of the desired dye-receptive copolymer in the aqueous saline solvent.

Surprising as it may seem, practice of the present method allows direct and straightforward preparation of a vinyl cyanide copolymer having a polymerized N-vinyl heterocyclic therein without difficulty due to decomposition of the N-heterocyclic monomer in the zinc chloride-containing aqueous saline solution.

The amount of the mixture of the vinyl cyanide and N-vinyl-3-morpholinone monomers that is included in the zinc chloride-containing salt solution is advantageously an amount that is adapted to provide between about 2 and about 20 weight percent of fiber-forming copolymer solids in the resulting spinning solution that is obtained upon completion of the polymerization, taking into account the degree of conversion of monomer to polymer that is desired to be (or which actually is) achieved in the polymerization reaction. More often, it may be desired for enough monomer to be employed to produce spinning solutions containing between about 6 and 15 weight percent of dissolved copolymer solids. Frequently, the best results for fiber manufacture may be obtained when the quantity of monomer that is provided is capable of furnishing a spinning solution or the like having in the range of 8.5 to 11.5 weight percent of dissolved fiber-forming copolymer solids.

In preparing the spinning solutions, the polymerization is generally facilitated by use of a suitable catalyst material. Catalysts which may be employed with advantage in the practice of the invention include such free radical-generating catalytic systems as azo-bis-isobutyronitrile, hydrogen and other peroxides, ammonium persulfate, potassium persulfate and the like, as well as radiation under the influence of high energy fields. Of course, if desired, the polymerization may be accomplished merely under the influence of heat at an elevated temperature insufficient to decompose the substances involved in the reaction. Higher quality products, however, are generally obtained when catalysts are employed which, as will be apparent to those skilled in the art, are utilized in the conventional material. When catalyst materials are employed, it is relatively inconsequential whether the monomeric material to be polymerized or the catalyst is first incorporated in the solvent.

In this connection, it is also desirable to control the content of both iron and copper ions in the aqueous zinc chloride-containing solution in order to obtain optimum molecular weight and chain length polymer product in a spinning solution of desirable viscosity. For this purpose, the general procedures indicated in U.S. 2,763,636 and 2,746,840 may be followed.

The polymerization may be effected at any temperature between about 20 and about 100° C., preferably in the range from about 40 to 60° C. The period of time in which polymerization may be satisfactorily accomplished depends, as is apparent, upon all of the conditions of the polymerization including monomer concentration in the saline solvent and the amount and type of catalyst, if any, employed as well as the temperature which is utilized. Ordinarily, the polymerization may be terminated with the formation of suitable spinning solution in a time period which rarely exceeds 64 hours and often may be as short as about 12 hours or less.

In this connection, it is generally desirable to continue the polymerization until at least about half of the available reactant monomer mixture is converted to fiber-forming solids. While polymerization may be continued to completion, it is also generally desirable in order to obtain an optimum product as regards molecular weight characteristics to stop the polymerization before about 80 or so percent of the monomer mixture has been converted to copolymer solids. When incomplete polymerization is practiced, the unreacted or partially reacted volatile constituents are generally readily removed from the spinning solution in a conventional debubbling or deaeration procedure prior to actual spinning.

The aqueous salt solution comprising zinc chloride which is employed as the polymerization media and the solvent for the resulting spinning solution in practice of the present invention is preferably a 55 to 65 weight percent solution, most desirably about a 60 weight percent solution, of zinc chloride as the sole saline constituent. If desired, however, the saline solvent utilized may be a zinc chloride-containing mixture prepared with one or more other inorganic salts for such purposes known to the art, as described in U.S. 2,648,647.

The spinning solutions prepared in practice of the present invention can be salt-spun in the known manner to for synthetic textile fiber products, or films if desired, using non-polyacrylonitrile dissolving aqueous solutions of zinc chloride or the like as the coagulating spin bath for the extruded products. The coagulation may advantageously be formed according to the procedure described in U.S. 2,790,700. Thus, the aqueous coagulating baths in which the fiber or the like products are formed upon salt spinning of the presently obtained spinning solutions may advantageously contain between about 25 and 50 weight percent of the dissolved salt, more advantageously from about 30 to 45 weight per cent, and preferably in the neighborhood of 42–43 weight percent.

The N-vinyl-3-morpholinone monomers that are copolymerized with vinyl cyanide in the practice of the present invention are of the structure:

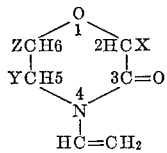

in which each of the X, Y and Z substituents can independently be either hydrogen or alkyl (including haloalkyl) substituents containing from 1 to about 4 carbon atoms. Advantageously, non-ring-substituted N-vinyl-3-morpholinone is employed wherein, according to the foregoing structure, X, Y and Z are all hydrogen. If desired, however, ring-substituted monomers may be employed such as N-vinyl-5-methyl-3-morpholinone; N-vinyl-5-ethyl-3-morpholinone; N-vinyl-5-butyl-3-morpholinone; and equivalent 2- or 6-substituted derivatives as well as like derivatives with plural (i.e., up to three) ring substituted alkyl groups; and analogous derivatives with one or more haloalkyl (such as chloromethyl, bromoethyl, etc.) substituent groups.

While it is ordinarily desirable for the fiber-forming, dye-receptive copolymers directly prepared by practice of the present invention to be two-component compositions (i.e., products of the polymerization of vinyl cyanide and the N-vinyl-3-morpholinone monomer) it is possible to use additional monomeric materials in their preparation, particularly when the polymerized copolymer product contains at least about 80 weight percent of polymerized vinyl cyanide and at least about 1 weight percent of the polymerized N-vinyl-3-morpholinone. Thus, other monomeric materials which may be employed are any one or more of the many other monomeric substances well known to the art capable of being copolymerized with vinyl cyanide to form fiber-forming polymer products. These include such materials as allyl alcohols, vinyl acetate, vinyl propionate, vinyl butyrate, methacrylamide, methyl acrylate, ethyl acrylate, 2-vinyl pyridine, dimethyl aminoethyl acrylate, methacrylonitrile, acrylic acid, butadiene, itaconic and fumaric acids, vinyl acetic acid, fumaronitrile, 2-vinyl-5-ethyl-pyridine, ethylene sulfonic acid and its alkali metal salts, allyl sulfonic acids and their alkali metal salts, styrene sulfonic acids and their alkali metal salts, sulfonated vinyl toluene and other sulfonated vinyl aryl monomers and the like.

In this connection, it is advantageous for the fiber-forming vinyl cyanide/N-vinyl-3-morpholinone copolymers that are made to be prepared by proportioning of the monomeric charge, so as to contain between about 80 and about 99 weight percent, preferably between about 85 and about 95 weight percent of polymerized vinyl cyanide in the copolymer molecule.

Fiber products from copolymeric spinning solutions made directly in accordance with the present invention have excellent physical properties and other desirable characteristics for a textile material. They also, as has been indicated, have a high capacity for and are readily and satisfactorily dyeable to deep and level shades of coloration with any of a wide variety of dyestuffs. For example, they may be easily and successfully dyed according to conventional procedure using acid, vat, acetate, direct, naphthol and sulfur dyes.

Such dyestuffs, by way of didactic illustration, as Calcocid Alizarine Violet (Colour Index 61,710, formerly Colour Index 1080), Sulfanthrene Red 3B (Colour Index Vat Violet 2), Amacel Scarlet GB (Colour Index 11,110—also known as Amacel Scarlet BS, and having American Prototype Number 244), Calcodur Pink 2BL (Colour Index 353, also more recently, Colour Index Direct Red 75), Naphthol ASMX (Colour Index 35,527), Fast Red TRN Salt (Colour Index Azoic Diazo Component 11), and Immedial Bordeaux G (Colour Index Sulfur Brown 12) may advantageously be employed for such purposes.

Other dyestuffs, by way of further illustration, that may be utilized beneficially on the fiber products from the copolymers of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151) and Erie Fast Scarlet 4BA (Colour Index Direct Red 24); such acid dyes as Anthraquinone Green GN (Colour Index Acid Green 25), Sulfonine Brown 2R (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid Milling Red 3R (Colour Index Acid Red 151), Alizarine Levelling Blue 2R (Colour Index Acid Blue 51), Amacid Azo Yellow G Extra (Colour Index Acid Yellow 63); such mordant-acid dyes as Alizarine Light Green GS (Colour Index Acid Green 25); such basic dyes as Brilliant Green Crystals (Colour Index Basic Green 1) and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), Sulfanthrene Blue 2B Dbl. Paste (Colour Index Vat Blue 5), and Sulfanthrene Red 3B Paste (Colour Index Vat Violet 2); various soluble vat dyestuffs; such acetate dyes as Celliton Fast Brown 3RA Extra CF (Colour Index Dispersed Orange 5), Celliton Fast Rubine BA CF (Colour Index Dispersed Red 13), Artisil Direct Red 3BP and Celanthrene Red 3BN Conc. (Both Colour Index Dispersed Red 15), Celanthrene Pure Blue BRS 400 percent (Colour Index Dispersed Blue 1) and Acetamine Yellow N (Colour Index Dispersed Yellow 32); B-Naphthol←2-chloro-4-nitroaniline, an azoic dye; such sulfur dyes as Katigen Brilliant Blue GGS High Conc. (Colour Index Sulf. Blue 9) and Indo Carbon CLGS (Colour Index Sulf. Blue 6); and various premetallized dyestuffs.

The dyed products are generally lightfast and stable to heat and are well imbued with a resistance to crocking. In addition, the dyed products exhibit good washfastness despite repeated exposure and subjection to washing, laundering and dry cleaning treatments.

The invention is further exemplified in and by the following docent illustrations in which, unless otherwise indicated, all parts and percentages are to be taken by weight.

FIRST ILLUSTRATION

A solution of the following composition was made:

292.8 grams vinyl cyanide
37.3 grams N-vinyl-3-morpholinone (VM)
2802 grams of a 58.5 percent zinc chloride-aqueous solution (pH 5.2 diluted 10:1 with distilled water)

After mixing, about 3.28 grams of azo-bis-isobutyronitrile (AIBN) were mixed into the solution. The entire resulting preparation was then raised to 50° C. After about four hours at 50° C., the solution (which had become viscous) was debubbled to rid it of air and other fugacious constituents.

The above debubbled solution was then cooled to room temperature, after which it was spun into fibers by extrusion thereof through a 500 hole spinnerette (having individual hole diameters of about 8 mils each) into an aqueous zinc chloride solution. The freshly spun fibers were then washed in fresh water and subsequently stretched in boiling water.

Three different fiber samples were made, but for all samples the coagulation bath concentration of $ZnCl_2$ was about 45.2 percent and the total stretch ratio was about 11.2 to 1.0.

The physical properties of the resulting fiber products were as set forth in the following tabulation (which also indicates some of the other conditions under which the fibers were spun):

*Table 1*

PHYSICAL PROPERTIES

| Sample | Temp. of Coag. Bath, °C. | Denier | | Tenacity, grams/denier | | Elongation, percent | | Yield, grams | | Young's Modulus | |
|---|---|---|---|---|---|---|---|---|---|---|---|
| | | Dry | Wet | Dry | Wet | Dry | Wet | Dry | Wet | Dry | Wet |
| "A" | 12.0 | 3.2 | 3.7 | 3.4 | 2.7 | 30 | 30 | 1.13 | 0.93 | 56 | 40 |
| "B" | 8.5 | 3.1 | 2.7 | 3.9 | 4.0 | 24 | 26 | 1.16 | 1.04 | 47 | 48 |
| "C" | 19.5 | 5.0 | 5.6 | 1.9 | 1.4 | 46 | 54 | 0.75 | 0.56 | 23 | 21 |

A sample of an acrylonitrile homopolymer prepared and spun under similar conditions as those employed for the above Sample "A" had the following physical properties:

| Denier | | Tenactity, grams/denier | | Elongation, percent | | Yield, grams/denier | | Young Modulus | |
|---|---|---|---|---|---|---|---|---|---|
| Dry | Wet | Dry | Wet | Dry | Wet | Dry | Wet | Dry | Wet |
| 3.4 | 3.1 | 3.45 | 2.9 | 44 | 49 | 0.90 | 0.79 | 32 | 32 |

Sample "A" dyed well to deep and level shades of coloration with excellent through penetration with Calcodur Pink 2BL (Colour Index Direct Red 75) in the conventional manner, after which its numerical reflectance value in the dyed state was determined. The reflectance value of the dyed sample was about 44.5. Fiber made identically from polyacrylonitrile had a reflectance value greater than 70 and, in addition, evidenced distinct characteristics of being only ring-dyed.

Infra-red analysis of the fiber of Sample "A" indicated that it contained polymerized in the molecule about 4.17 percent of the VM.

The above-mentioned dyeing with Calcodur Pink 2BL was performed at the 2 percent level according to conventional procedure, in which the fiber sample was maintained for about one hour at the boil in the dye bath which contained the dyestuff in an amount equal to about 2 percent of the weight of the fiber (O.W.F). The dye bath also contained sodium sulfate (i.e., Glauber's salt) in an amount equal to about 15 percent O.W.F. and had a bath-to-fiber weight ratio of about 30:1, respectively. After being dyed, the fiber was rinsed thoroughly with water and dried for about 20 minutes at 80° C. The dye-receptivity of the Calcodur Pink 2BL-dyed fiber was then evaluated spectrophotometrically by measuring the amount of monochromatic light having a wave length of about 520 millimicrons from a standard source that was reflected from the dyed sample. A numerical value on an arbitrarily designated scale from 0 to 100 was thereby obtained. This value represented the relative comparison of the amount of light that was reflected from a standard white tile reflector that had a reflectance value of 316 by extrapolation from the 0–100 scale. Lower reflectance values are an indication of better dye-receptivity in the fiber. For example, a reflectance value of about 20 or 25 to 50 or so for vinyl cyanide polymer fibers dyed with 2 percent Calcodur Pink 2BL is generally considered by those skilled in the art to be representative of a degree of dye-receptivity that readily meets or exceeds the most rigorous practical requirements and is ordinarily assured of receiving general commercial acceptance and approval.

SECOND ILLUSTRATION

Another solution of the polymer in a zinc chloride solution was made in a manner similar to that described in the first illustration. The composition of the starting solution was:

Grams
58.5 percent aqueous solution of $ZnCl_2$ _____ 1401
(pH 5.77 upon 10:1 dilution with distilled water)
VCN _____ 146.4
VM _____ 18.68
AIBN _____ 1.64

The reaction mixture was kept at 50° C. for 24 hours and then debubbled. The resultant polymer solution was spun through a 498 round jet hole spinnerette (of individual 3 mil diameter) under the conditions specified in, and had the properties shown by, the following Table 2:

Table 2
SPINNING CONDITIONS AND PROPERTIES

| Fiber Sample | ZnCl₂ Conc. of Coag. Bath | Temp. of Coag. Bath, °C. | Stretch | Denier | | Tenacity, grams/denier | | Elongation, percent | | Yield, grams | | Young's Modulus | |
|---|---|---|---|---|---|---|---|---|---|---|---|---|---|
| | | | | Dry | Wet | Dry | Wet | Dry | Wet | Dry | Wet | Dry | Wet |
| "D" | 42.5 | 3.8 | 13.1× | 2.4 | 2.5 | 4.0 | 3.5 | 23 | 29 | 0.97 | 0.81 | 47 | 43 |
| "E" | 42.5 | 3.8 | 15.5× | 2.4 | 2.2 | 4.4 | 4.2 | 18 | 18 | 1.13 | 0.77 | 50 | |
| "F" | 40.5 | 3.8 | 15.6× | 2.9 | 3.0 | 4.3 | 4.1 | 18 | 17 | 1.00 | 0.80 | 40 | 50+ |

NOTE.—Under a tension of about 1 gm./√denier, Sample "D" had an average flex life of 925 cycles; Sample "F" had an average flex life of 1,462 cycles.

THIRD ILLUSTRATION

The procedure of the first illustration was again followed. The composition of the initial reaction mixture was:

|  | Grams |
|---|---|
| 58.5 percent ZnCl₂ solution | 1400 |
| VCN | 147 |
| VM | 9.34 |
| AIBN | 1.64 |

The polymerization was conducted at 50° C. for 24 hours. The resulting solution was then debubbled, and spun pursuant to the indications in the following tabulation (in which the properties of the fiber product are also included):

Table 3
SPINNING CONDITIONS AND PROPERTIES

| | |
|---|---|
| Coagulation bath concentration | 43.5 percent ZnCl₂. |
| Coagulation bath temperature | 4.5° C. |
| Total stretch | 14.5:1.0. |
| Denier | 2.0 dry; 1.9 wet. |
| Tenacity | 2.6 grams/denier dry; 1.9 grams/denier wet. |
| Elongation | 27 percent dry; 33 percent wet. |
| Yield | 0.98 grams dry; 0.71 gram wet. |
| Young's modulus | 44 dry; 23 wet. |
| Fiber density | 1.143 grams/cubic centimeter. |

Results similar to those obtained in the foregoing may be achieved when other zinc chloride-containing aqueous saline solvent media are utilized under other conditions of polymerization within the above-indicated scope or when the vinyl cyanide copolymers are prepared with N-vinyl-3-morpholinone monomers of the ring-substituted variety in place of the non-ring-substituted species.

What is claimed is:

1. Method for preparing spinnable compositions of fiber-forming dye-receptive vinyl cyanide copolymers which comprises dissolving, in an aqueous polyacrylonitrile-dissolving saline solution that is comprised of zinc chloride as the essential saline constituent, a copolymerizable mixture comprised of (1) between about 80 and about 99 weight percent of vinyl cyanide and (2) between about 20 and about 1 weight percent of an N-vinyl-3-morpholinone monomer of the structure:

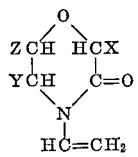

wherein X, Y and Z are each independently selected from the group consisting of hydrogen and alkyl radicals containing from 1 to about 4 carbon atoms, said monomer being admixed in such proportion in said aqueous saline solvent that the resulting admixture contains said monomer mixture dissolved therein in an amount to provide, when subsequently converted to polymer, between about 2 and 20 weight percent of dissolved polymer solids in said aqueous salt solution, then polymerizing the monomer mixture in said saline solvent at a temperature between about 20 and about 100° C. until the proportion of said monomer mixture converted to fiber-forming copolymer provides between about 2 and about 20 weight percent of dissolved copolymer solids in said aqueous salt solution.

2. The method of claim 1, wherein said aqueous, polyacrylonitrile-dissolving saline solution consists of between about 55 and about 65 weight percent of zinc chloride, based on the weight of the aqueous solution.

3. The method of claim 1, wherein said monomer mixture contains between about 85 and about 95 weight percent of vinyl cyanide.

4. The method of claim 1, wherein said N-vinyl-3-morpholinone monomer is N-vinyl-3-morpholinone.

5. The method of claim 1, wherein the monomer admixture is admixed in said saline solution in a quantity to provide, upon polymerization, from about 8.5 to about 11.5 weight percent of polymer solids in the resulting spinning solution.

6. The method of claim 1, wherein said monomer mixture is polymerized until at least half of the starting monomer is converted to fiber-forming polymer solids.

7. The method of claim 1 and including, in addition thereto and in combination therewith, the sequential step of extruding the resulting spinning solution into a shaped article in a coagulating liquid for said spinning solution.

References Cited by the Examiner

UNITED STATES PATENTS

| | | | |
|---|---|---|---|
| 2,356,767 | 8/1944 | Kropa | 260—29.6 |
| 2,648,647 | 8/1953 | Stanton et al. | 260—29.6 |
| 2,790,783 | 4/1957 | Coover | 260—895 |
| 2,818,399 | 12/1957 | Drechsel | 260—85.5 |
| 2,837,492 | 6/1958 | Stanton et al. | 260—29.6 |
| 2,897,182 | 7/1959 | De Benneville et al. | 260—29.6 |
| 2,931,694 | 4/1960 | Wirth et al. | 260—895 |
| 2,987,509 | 6/1961 | Burgert | 260—88.3 |
| 3,029,213 | 4/1962 | Armen et al. | 260—88.3 |
| 3,061,597 | 10/1962 | Burgert | 260—85.5 |

SAMUEL H. BLECH, *Primary Examiner.*

DANIEL ARNOLD, LEON J. BERCOVITZ, MURRAY TILLMAN, *Examiners.*